United States Patent [19]

Lee et al.

[11] Patent Number: 4,576,862

[45] Date of Patent: Mar. 18, 1986

[54] POLYIMIDE LAMINANT AND PROCESS FOR THE PREPARATION OF SAME

[75] Inventors: Raymond Lee, Elk Grove Village; Gregory A. Ferro, Mt. Prospect, both of Ill.

[73] Assignee: Imi-Tech Corporation, Elk Grove Village, Ill.

[21] Appl. No.: 754,774

[22] Filed: Jul. 15, 1985

[51] Int. Cl.$^4$ .......................... B32B 3/26; B32B 27/08
[52] U.S. Cl. .................................. 428/317.7; 156/196; 156/222; 264/321; 428/318.6; 428/318.8; 428/319.7; 428/473.5
[58] Field of Search ............... 428/314.4, 314.8, 317.1, 428/317.7, 318.6, 318.8, 319.3, 319.7, 473.5; 156/196, 222; 264/321

[56] References Cited

U.S. PATENT DOCUMENTS

| | | | |
|---|---|---|---|
| 4,468,431 | 8/1984 | Okey | 428/317.7 |
| 4,488,619 | 12/1984 | O'Neil | 428/319.7 |
| 4,539,342 | 9/1985 | Lee et al. | 521/189 |

Primary Examiner—William J. Van Balen
Attorney, Agent, or Firm—McDougall, Hersh & Scott

[57] ABSTRACT

A laminate and a method for its preparation comprising a polyimide foam, a fire-resistant, heat-activated adhesive overlaying a skin on the foam and a polyimide film adhered to the skin, with the laminate being prepared by contacting a foam in contact with the adhesive and film under heat and pressure to simultaneously form a skin on one surface of the foam and bond the polyimide film through the adhesive to the skin.

24 Claims, No Drawings

POLYIMIDE LAMINANT AND PROCESS FOR THE PREPARATION OF SAME

This invention relates to laminants formed from polyimide foams and more particularly to laminants of closed cell polyimide foams having a flexible, hydrophobic, nonporous, vapor impermeable skin on one surface thereof.

It is known, as is described in U.S. Pat. Nos. 3,966,652 and 4,315,076, that polyimides can be produced which are hydrolytically stable and which have improved fire resistance properties, giving off essentially no smoke or toxic fumes when exposed to flame.

Foams of the type there described are useful in aircraft cabins, space vehicles, land and sea transport equipment, as well as other applications where relatively non-flammable and negligible smoke-emitting characteristics are desirable.

In the practice of the prior art as described above, such polyimide foams are prepared by reacting an alkyl diester of a tetracarboxylic acid with one or more aromatic and/or heterocyclic diamines. Typically, a tetracarboxylic dianhydride is reacted with methanol or ethanol to form the corresponding diester which is then reacted with the amine or amines to form the corresponding polyamide-acid/ester which can then be converted to a polyimide by further heating. As a general rule, a cellular structure is developed, because both water and a lower alkyl alcohol corresponding to the alcohol portion of the ester is generated in situ during the reaction. These volatile materials produce open cell polyimide foams which are flexible and resilient and have fine, homogeneous cellular structure.

While amines of the type described above represent a significant advance in the art, their properties when used in insulation in applications involving high humidity are not as great as might be desired. Specifically, foams produced in accordance with the foregoing concepts possess an open cellular structure and therefore do not have significantly high vapor-barrier qualities to facilitate their use in, for example, fire-resistant, antisweat submarine hull insulation.

It is known, as described by St. Clair et al. in *Int. J. Adhesion and Adhesives*, 249–50 (July, 1981), that adhesives can be prepared by reaction of tetracarboxylic acid dianhydride with amine-terminated butadiene acrylonitrile to produce polyimide adhesives. Because of the viscosity and molecular weight of such amine-terminated butadiene-acrylonitrile copolymers, such amines are not capable of reaction with tetracarboxylic acid dianhydrides to provide flexible, resilient closed cell foams.

It has been found, as described in copending application Ser. No. 596,298, filed Apr. 3, 1984, now U.S. Pat. No. 4,539,342, that significantly improved vapor barrier characteristics can be imparted to polyimide foams when the foams are prepared by reaction of a tetracarboxylic acid dianhydride dimethylester with a combination of an aromatic diamine and an amine-terminated copolymer of butadiene and acrylonitrile. It has been found that polyimides prepared from such a reaction mixture cannot only be foamed but produce foams which can be used under conditions of high humidity to provide vapor barrier qualities.

Further improvements in vapor barrier characteristics are described in Ser. No. 696,007, filed Jan. 29, 1985, where there is disclosed a polyimide foam article which has been contacted with a heated surface to coalesce the polyimide on the surface and form a flexible, non-porous, vapor impermeable skin on the surface of the foamed article.

While the polyimides described above represent a further advance in the art of polyimide foams having good vapor barrier characteristics, the polyimide still leaves room for improvement in terms of flexibility of the skin and puncture resistance.

It is accordingly an object of the invention to provide the polyimide foam laminate which can be used under conditions of high humidity to provide high vapor characteristics.

It is a more specific object of the invention to provide a polyimide foam laminate having a tough, resilient, heat resistant surface which has even further improved vapor barrier characteristics.

The concepts of the present invention reside in a laminate and method for its preparation which is formed of a polyimide foam prepared by foaming a prepolymer derived from an organic tetracarboxylic acid or ester derivative thereof, an aromatic diamine and an organic liquid diamine containing at least 50% by weight of a conjugated diene. The foam is thus contacted with a heated surface which serves to coalesce the cells of the polyimide foam to form a flexible, non-porous, vapor impermeable skin on that surface. Toughness of the skin is further improved by bonding to the skin on the polyimide foam as it is formed a polyimide film which is adhered to the skin by means of a fire-resistant, heat-activated adhesive layer. It has been found that the laminate of the present invention provides greater flexibility in the foam and added puncture resistance. In addition, the laminate has further improved vapor barrier characteristics.

The polyimide foam is prepared in accordance with the teachings of copending application Ser. No. 696,007. In the practice of the invention, the polyimide foam is one prepared by reaction of an organic tetracarboxylic acid or its anhydride or ester derivative with an aromatic diamine and an organic diamine which is an amine-terminated polymer of at least 50% by weight of a conjugated diene, either alone or copolymerized with at least one vinyl monomer copolymerized therewith. Such copolymers can be end blocked with an aliphatic or aromatic unsaturated amine to provide the desired amine termination. A number of vinyl monomers copolymerizable with a conjugated diene may be used including styrene as well as substituted styrenes, such as alphamethylstyrene and various other substituted styrenes. In addition, use can also be made of acrylonitrile, methacrylonitrile and combinations thereof. As the conjugated diene, use can be made of butadiene as well as other well-known conjugated dienes such as chloroprene, isoprene, and the like.

The copolymer of the conjugated diene and the vinyl monomer, when the amine-terminated copolymer contains a vinyl monomer, is preferably one formed by free radical polymerization. Typically, the conjugated diene polymer or copolymer has a low molecular weight, preferably less than about 3000 to insure that it is sufficiently fluid to react in the formation of the polyimide as well as sufficiently fluid so as to be capable of foaming. The resulting polymer or copolymer can then be end-capped with either aromatic or aliphatic unsaturated amines in accordance with conventional techniques.

In the preferred practice of the invention, the amine-terminated butadiene-nitrile copolymer has the general formula:

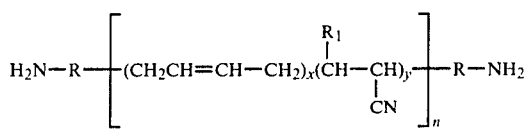

wherein R is either a phenylene group or an alkylene group, $R_1$ is hydrogen or methyl, and x and y are each independently integers ranging from 1 to 25 and n is an integer, preferably below 20.

In this preferred embodiment of the invention, the amine-terminated butadiene-nitrile copolymer is a butadiene-nitrile rubber wherein butadiene constitutes at least 50 percent by weight of the total of the butadiene and nitrile. The nitrile monomer copolymerized with the butadiene can either be acrylonitrile or methacrylonitrile and the polymerization reaction can be carried out in accordance with conventional free radical polymerization techniques. The copolymer produced is a random copolymer containing both butadiene and acrylonitrile or methacrylonitrile in the polymer backbone. The amine functionality is introduced by end-capping of the copolymer with, for example, paraaminostyrene or allylamine in accordance with conventional techniques.

In the preferred practice of the invention, the organic tetracarboxylic acid in the form of its diester from methanol or ethanol is reacted with one of the foregoing diamines, either alone or in combination with other amines to form a polyamide-acid/ester prepolymer which can be foamed and cured, either alone or in the presence of a blowing agent, to provide the desired polyimide foam.

The tetracarboxylic acids or derivatives thereof preferably employed in the practice of the invention are those having the general formula:

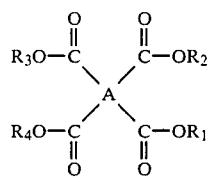

wherein A is a tetravalent organic group and $R_1$ to $R_4$, inclusive, are each selected from the group consisting of hydrogen and lower alkyl, and preferably methyl, ethyl or propyl. The tetravalent organic group A is preferably one having one of the following structures:

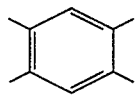

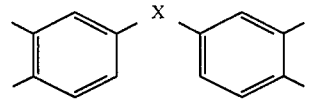

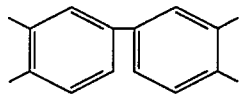

wherein X is one or more of the following:

Preferred among the tetracarboxylic acid and derivatives thereof is 3,3',4,4'-benzophenone tetracarboxylic acid and its corresponding lower alkyl (preferably lower dialkyl) esters.

As the organic diamine, use is preferably made of one or more aromatic and/or heterocyclic diamines which are themselves known to the art. Such aromatic diamines can be represented by the structure:

$$H_2N-R_2-NH_2$$

wherein $R_2$ is an aromatic diamine group containing 5 to 16 carbon atoms and containing up to one hetero atom in the ring, the hetero atom being selected from the group consisting of —N—, —O— and —S—. Also included herein are those $R_2$ groups wherein $R_2$ is a diphenyl group or a diphenylmethane group. Representative of such diamines are:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene.

It is also possible, and sometimes desirable in the preparation of the polyamide-acid/ester prepolymer, to include in the reaction mixture one or more aliphatic diamines. Such aliphatic diamines are preferably alpha-omega diaminoalkanes having the general formula:

$$HN_2-(CH_2)_a-NH_2$$

wherein a is an integer from 2 to 16. Representative of such diamines include 1,3-diaminopropane, 1,4-diamino-butane, 1,5-diaminopentane, 1,6-diaminohexane, etc.

In place of the foregoing aliphatic amines, use can also be made of the polyamines marketed by Texaco Chemical Company under the trademark JEFFAMINE. Those amines can be described as polyoxypropylene amines, and have the formula:

$$NH_2CH(CH_3)CH_2-OCH_2CH(CH_3)-_xNH_2$$

wherein x varies from 1 to about 5.

In accordance with one preferred embodiment of the invention, the polyamide-acid/ester prepolymer is formed by reaction of a dialkyl ester of the organic tetracarboxylic acid with the amines described above. The relative proportions used in the preparation of the prepolymer can be varied to relatively wide limits to provide good foams. In general, it is preferred to employ between 0.5 to 1.5 total moles of amine per mole of the tetra-carboxylic acid dianhydride or ester derivative thereof. The aromatic amine generally constitutes from 92.5 to 99.9999 mole % based on the number of moles of the tetracarboxylic acid or derivative, while the proportion of the amine-terminated diene polymer constitutes 0.0001 to 7.5 mole % based on the total moles of tetracarboxylic acid or derivative thereof.

It is also possible, and sometimes preferred, to employ a combination of aromatic amines, as described above, which is carbocyclic with an N-heterocyclic amine of the sort described above in addition to the amine-terminated butadiene-nitrile copolymer.

It is also possible to employ, as a fourth amine component, the aliphatic amine described above. When the aliphatic amine is employed, it is generally used in an amount ranging from 1 to 40 percent based on the total moles of the acid anhydride or ester employed.

In the preparation of the prepolymer, the tetracarboxylic acid dianhydride derivative, usually in the form of the diester, is reacted with the diamine or diamines at a temperature at or below the reflux temperature of the reaction mixture. Without limiting the invention as to theory, it is believed that the prepolymer is formed of a low-molecular weight polyamide-acid/ester which can then be heated to complete the polymerization reaction. The prepolymer can thus be in the form of a liquid or a solid having a low molecular weight, so long as it is capable of being converted by further reaction to a high-molecular weight polyimide polymer.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of blowing agents, such as the solid blowing agents described in co-pending application Ser. No. 532,663, filed Sept. 16, 1983, the disclosure of which is incorporated herein by reference.

As there described, the homogeneity of the cellular structure of the resulting polyimide foam can be more accurately controlled by controlling the particle size of the solid blowing agent, when such a blowing agent is employed. It has been found that the particle size of the solid blowing agent is preferably less than 200 microns in diameter, with 98% of the blowing agent particle sizes being less than 150 microns in diameter.

In the practice of the invention, it is possible to include in the reaction mixture various filler and/or reinforcing materials. For example, graphite, glass and other synthetic fibers can be added to the composition to produce a fiber-reinforced product. It is frequently desirable to employ a surfactant, thereby increasing bubble stability and the uniformity of the cellular structure, to increase the fatigue resistance of the foam and to make the foam more flexible and resilient. Such surfactants are themselves conventional, and form no part of the present invention.

The temperatures at which the prepolymer is converted to the polyimide polymer are generally those temperatures used in the preparation of other polyimide polymers. As a general rule, temperatures ranging from 200° to 400° C. can be used, with heating times ranging from 5 to 60 minutes or longer. As those skilled in the art will appreciate, the time for carrying out the reaction is somewhat dependent on the reaction temperature, higher temperatures enabling the use of shorter reaction times. It is also possible to heat to a lower temperature in the first stage of the reaction and than higher temperatures in the later stages.

Heating can be carried out in a conventional oven if desired. Alternatively, the foaming and curing of the prepolymer into a polyimide polymer can be effected by means of microwave heating. It has been found that the prepolymer can be converted to the corresponding polyimide foam by exposing the prepolymer for 1 to 120 minutes to radio frequencies within the range 915 to 2450 mHz, with the power output ranging from 1 to 100 kw. The power output to prepolymer weight ratio generally reads from about 0.1 to 100 kw per kg.

Once the foam has been produced, the laminate is formed by coating at least one surface of the foam with the adhesive and laying down the polyimide film on top of the adhesive layer. Thereafter, heating is applied to the polyimide film under conditions of temperature and pressure sufficient to melt the surface of the foam and cause the cells thereof to coalesce and thereby form a skin on the surface. At the same time, the heat-activated adhesive is also activated under conditions of temperature to cause the polyimide film to be securely formed on the surface of the foam.

In the preferred practice of the invention, the foam is contacted with a heated surface at a pressure sufficient to cause the cells of the foam to coalesce and for a time sufficient to cause complete melting and solidification of the polyimide foam thus melted into the skin. At the same time, the temperature is sufficient to activate the heat-activated adhesive to insure that the polyimide foam is bonded to the skin simultaneously formed.

In the preferred practice of the invention, the surface of the foam is heated to a temperature within the range of 200° to 350° C., and preferably 260° to 290° C. To effect the heating of the foam and thus cause coalescence of the cells, use is preferably made of a heated platen fabricated of either a metal or metal-coated with a non-stick tetrafluoroethylene material such as Teflon, marketed by DuPont. Also suitable for use in the invention are Teflon-coated glass cloths which are heated to the desired temperature and contacted with foam.

It is generally sufficient that the foam be contacted with the heated surface for a period of at least 0.75 minutes, and generally within the range of 1 to 5 minutes, with 3 to 4 minutes being preferred, depending in part on the thickness of the skin desired. As will be appreciated by those skilled in the art, both shorter and longer contact times can be employed. In general, a slight positive pressure of the heated surface on the surface of the foam is desirable to accelerate the melting and coalescence of the foam. In general, pressures of 0.25 to 5 psi can be used for that purpose.

As described above, the polyimide film adhered to the skin on the foam is one film having good toughness. The preferred polyimide film employed in the practice of this invention is a polyimide film prepared by reaction of an organic tetracarboxylic acid or anhydride or ester derivative of the type described above and one of the aromatic diamines described above. For optimum results, use is preferably made of a polyimide made of a polyimide film formed substantially from pyromellitic dianhydride or its corresponding ester with oxydianiline. That polyimide is commercially available from DuPont under the trademark "KAPTON". It has been found that the polyimide film, adhered to the skin of the polyimide foam by a fire-resistant, heat-activated adhesive provides excellent vapor barrier characteristics, good fire resistance and improved toughness.

The adhesive is, as indicated, a fire-resistant, heat-activated adhesive, such adhesives themselves being known to those skilled in the art. One adhesive that has been found to provide particularly good results are the fluorocarbon films manufactured by DuPont, usually in the form of a fluorinated ethylene-propylene copolymer. Such an adhesive is commercially available from DuPont, and has been found to be particularly well suited for use in the practice of the present invention.

The thickness of the polyimide film adhered to the skin of the foam is not critical and can be varied within relatively broad ranges. Good results are usually obtained when the polyimide film ranges from 0.00001 to 0.1 inches. The thickness of the adhesive can likewise be varied within relatively wide ranges, best results usually being obtained with a adhesive film thickness of 0.000001 to 0.01 inches.

Having described the basic concepts of the invention, reference is now made to the following examples which are provided by way of illustration, but not by way of limitation, of the practice of the invention.

EXAMPLE 1

This example illustrates the practice of the present invention in the use of the amine-terminated butadiene-acrylonitrile copolymer.

To 322.23 g (1 mole) of benzophenontetracarboxylic acid dianhydride (BTDA) add 240 ml of methanol ($CH_3OH$) and 24 ml of $H_2O$. The reactants are slurried and then heated to reflux, 67°–72° C., to form the methyl ester of benzophenonetetracarboxylic acid. After esterification is complete, 0.654 g of the the amine-terminated butadieneacrylonitrile copolymer is added to the refluxing solution and mixed, under reflux conditions, for 30 to 180 minutes. The remaining diamines (2,6-diaminopyridine (32.70 g) and p,p'-methylenedianiline (138.45 g)) are then added individually and allowed to mix for 15 minutes before the addition of the next diamine while maintaining the batch temperature above 50° C.

Following the addition of the last diamine, the reaction mixture is heated to between 65°–70° C. for 5 to 200 minutes. After the reaction is complete, the mixture is cooled to 60° C., and 11.53 g of a surfactant is added. Conversion to powder is accomplished by drying for 90 to 120 minutes at 65° C., then at 65° C. and 128 mm Hg pressure from 45 to 75 minutes, then at 65° C. and 26 mm Hg pressure from 45 to 75 minutes. The resulting friable material is then pulverized and passed through a 600 micron sieve.

Foams are prepared by exposure to microwave energy (1.4 to 100 kw) for 6 to 200 minutes and then cured for 30 to 200 minutes at 232°–300° C.

An electrically-heated platen press is heated to between 520° to 600° F., only the bottom platen being heated. The heated platen is then covered with a sheet of Teflon-coated glass fabric or Teflon coating to prevent sticking. A piece of polyimide film in the form of KAPTON polyimide film having a thickness of 0.001 inches having a coating on one surface with a thickness of 0.0005 inches of heat-activated adhesive, Teflon FEP 54A fluorocarbon is laid on top of the Teflon-coated glass sheet with the adhesive layer facing upwardly. A 1.25-inch thick sheet of the closed cell polyimide foam described above is placed on top of the film and the press is closed to a gap of 1.0 inch. The press is held in the closed position for 30 to 120 seconds for the adhesive to melt and flow and to form a skin on the polyimide film.

The pressure is released and it is found that the polyimide film is securely adhered to the skin, resulting in a flexible composite which is resistant to abrasion, puncture, fire and the passage of water vapor.

EXAMPLE 2

This example illustrates the relative vapor barrier characteristics of the various components employed in the manufacture of the composite of the present invention relative to the composite itself.

The various components of the laminate of this invention are tested to determine their water vapor transmission properties, with the following results:

| Article | WVTR (Perm-in) |
| --- | --- |
| Closed cell foam as prepared in Example 1 | 45.0 |
| Closed cell foam as prepared in Example 1 with a 0.025" skin on one surface thereof | 25.0 |
| 0.001" thick KAPTON film with 1" of closed cell foam of Example 1 | 2.0 |
| 0.0005" thick FEP adhesive film on 1" closed cell foam of Example 1 | 0.35 |
| Composite of the invention with 0.001" KAPTON film secured with 0.0005" FEP adhesive film on 1" closed cell foam of Example 1 with 0.025" thick skin | 0.34 |

As can be seen from the foregoing table, the laminate of the present invention provides improved water vapor transmission characteristics while, at the same time, providing increased abrasion resistance, puncture resistance and greater flexibility.

It will be understood that various changes and modifications can be made in the details of procedure, formulation and use without departing from the spirit of the invention, especially as defined in the following claims.

We claim:

1. A laminate having improved vapor barrier properties comprising:
   (a) a polyimide foam prepared by forming a prepolymer formed from (1) an organic tetracarboxylic acid or anhydride or ester derivative, (2) an aromatic diamine having the formula:

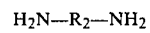

$H_2N-R_2-NH_2$ wherein $R_2$ is an aromatic group containing 5 to 16 carbon atoms, and (3) an organic liquid diamine containing at least 50% by weight of a conjugated diene, said foam having a vapor impermeable skin on one surface thereof formed by heating one surface of the foam to coalesce the polyimide on the surface;
   (b) a fire-resistant, heat-activated adhesive layer overlaying the skin; and, (c) a polyimide film adhered to said skin by said adhesive.

2. A laminate as defined in claim 1 wherein the adhesive is a fluorocarbon film.

3. A laminate as defined in claim 1 wherein the polyimide film is formed from pyromellitic dianhydride or a diester thereof and an aromatic diamine.

4. A laminate as defined in claim 3 wherein the aromatic diamine is ODA.

5. A laminate as defined in claim 1 wherein the adhesive is a fluorinated ethylene-propylene copolymer.

6. A laminate as defined in claim 1 wherein the organic diamine is an amine-terminated polymer of at least 50% by weight of a conjugated diene alone or copolymerized with at least one vinyl monomer copolymerizable therewith which is end blocked with an aliphatic or aromatic amine.

7. A laminate as defined in claim 6 wherein the vinyl monomer is selected from the group consisting of styrene, acrylonitrile, methacrylonitrile, and combinations thereof.

8. A laminate as defined in claim 1 wherein the tetracarboxylic acid is a di(loweralkyl) ester of benzophenone tetracarboxylic acid.

9. A laminate as defined in claim 1 wherein the tetracarboxylic acid derivative is a compound having the formula:

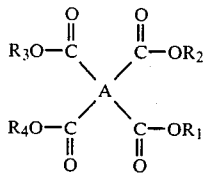

wherein A is a tetravalent organic group and $R_1$ and $R_4$ are each selected from the group consisting of hydrogen and lower alkyl.

10. A laminate as defined in claim 1 wherein the aromatic diamine is methylene dianiline.

11. A laminate as defined in claim 1 which includes at least one aromatic and at least one heterocyclic diamine.

12. A laminate as defined in claim 1 which includes at least one aliphatic diamine.

13. A laminate as defined in claim 1 wherein the surface of the foam is contacted with a heated surface under conditions of heat and pressure sufficient to coalesce the cells of the foam to form the flexible, non porous, vapor-impermeable skin.

14. A laminate as defined in claim 1 wherein the surface is heated to a temperature within the range of 225° to 320° C.

15. A method for preparing a laminate having a flexible, non-porous surface comprising the steps of heating at least one surface of a polyimide foam in contact with a fire-resistant, heat-activated adhesive layer and a polyimide film in contact with the adhesive layer under conditions of heat and pressure sufficient to melt the surface of the foam and cause the cells thereof to coalesce to form a flexible, non-porous, vapor-impermeable skin to which the polyimide is bonded by means of adhesive, said polyimide foam being prepared from a prepolymer formed from (1) an organic tetracarboxylic acid or anhydride or ester derivative, (2) an aromatic diamine having the formula:

$$H_2N-R_2-NH_2$$

wherein $R_2$ is an aromatic group containing 5 to 16 carbon atoms, and (3) an organic liquid diamine containing at least 50% by weight of a conjugated diene, said foam having a vapor impermeable skin on one surface thereof formed by heating one surface of the foam to coalesce the polyimide on the surface.

16. A method as defined in claim 15 wherein the foam is contacted with a heated surface at a pressure sufficient to cause the cells of the foam to coalesce to form the skin.

17. A method as defined in claim 15 wherein the surface of the foam is heated to a temperature within the range of 225° to 320° C.

18. A method as defined in claim 17 wherein the foam is heated for at least 0.75 minutes.

19. A method as defined in claim 15 wherein the organic diamine is an amine-terminated polymer of at least 50% by weight of a conjugated diene alone or copolymerized with at least one vinyl monomer copolymerizable therewith which is end blocked with an aliphatic or aromatic amine.

20. A method as defined in claim 15 wherein the vinyl monomer is selected from the group consisting of styrene, acrylonitrile, methacrylonitrile, and combinations thereof.

21. A method as defined in claim 15 wherein the tetracarboxylic acid is a di(loweralkyl) ester of benzophenon tetracarboxylic acid.

22. A process as defined in claim 15 wherein the foam is prepared in the presence of a solid blowing agent.

23. A method as defined in claim 15 wherein the polyimide film is prepared by reaction of an organic tetracarboxylic acid or anhydride or ester derivative and an aromatic diamine.

24. A laminate as defined in claim 15 wherein the adhesive is a fluorinated ethylene-propylene copolymer.

* * * * *